United States Patent [19]

Suman et al.

[11] Patent Number: 5,039,155
[45] Date of Patent: Aug. 13, 1991

[54] VEHICLE SEATING SYSTEM

[75] Inventors: Michael J. Suman; David A. Muyres; Kenneth M. Lindberg; Nathan W. Young; Mark R. Litke, all of Holland, Mich.

[73] Assignee: Prince Corporation, Holland, Mich.

[21] Appl. No.: 567,795

[22] Filed: Aug. 15, 1990

[51] Int. Cl.$^5$ .................................................. B60N 1/02
[52] U.S. Cl. .................................. 296/65.1; 296/37.15
[58] Field of Search .................... 296/65.1, 37.15, 63, 296/69; 297/311, 344; 248/421, 422

[56] References Cited

U.S. PATENT DOCUMENTS

| | | | |
|---|---|---|---|
| 1,279,635 | 9/1918 | Belvel | 296/26 |
| 2,160,958 | 6/1939 | Critchlow | 311/21 |
| 2,249,845 | 7/1941 | Mitchell | 155/124 |
| 2,284,419 | 5/1942 | Greig | 296/26 |
| 2,470,314 | 5/1949 | Lim | 296/26 |
| 2,471,730 | 5/1949 | Doerr | 311/21 |
| 2,545,269 | 3/1951 | Ford | 312/337 |
| 2,903,042 | 9/1959 | Thornburg | 155/5 |
| 3,406,998 | 8/1966 | Rutzen et al. | 296/19 |
| 3,463,539 | 8/1969 | Racine et al. | 296/23 |
| 3,550,949 | 12/1970 | Bennaud | 296/69 |
| 3,887,229 | 6/1975 | Plume | 297/65 |
| 3,899,151 | 8/1975 | Kobrehel | 248/429 |
| 3,915,493 | 10/1975 | Brown | 296/63 |
| 3,924,892 | 12/1975 | Geier | 297/440 |
| 3,955,846 | 5/1976 | Murphy | 296/65 |
| 3,973,799 | 8/1976 | Berg | 297/341 |
| 4,085,962 | 4/1978 | Wahis | 296/65 R |
| 4,169,574 | 10/1979 | Garvey et al. | 248/429 |
| 4,186,960 | 2/1980 | Mizelle | 297/63 |
| 4,190,911 | 3/1980 | Wadsworth | 5/44 R |
| 4,200,329 | 4/1980 | Inami et al. | 296/69 |
| 4,281,871 | 8/1981 | Grittner et al. | 296/65 |
| 4,303,367 | 12/1981 | Bott | 414/522 |
| 4,325,446 | 4/1982 | Hicks | 180/89.17 |
| 4,443,034 | 4/1984 | Beggs | 296/65 R |
| 4,455,948 | 6/1984 | Torres | 108/44 |
| 4,463,932 | 8/1984 | Rees | 248/429 |
| 4,473,250 | 9/1984 | Truex et al. | 296/37.16 |
| 4,505,509 | 3/1985 | Simeri et al. | 296/63 |
| 4,515,404 | 5/1985 | Nishimura et al. | 296/65.1 |
| 4,563,044 | 1/1986 | Rees | 308/3.8 |
| 4,611,852 | 9/1986 | Filer | 297/352 |
| 4,624,498 | 11/1986 | Nagashima et al. | 296/65 |
| 4,636,005 | 1/1987 | Bolz et al. | 297/379 |
| 4,637,648 | 4/1978 | Okino et al. | 296/63 |
| 4,641,884 | 2/1987 | Miyashita et al. | 297/284 |
| 4,699,418 | 10/1987 | Plavetich | 296/65 R |
| 4,708,387 | 11/1987 | Yamano et al. | 296/63 |
| 4,712,759 | 12/1987 | Sugama et al. | 248/429 |
| 4,730,804 | 3/1988 | Higuchi et al. | 248/429 |
| 4,730,874 | 3/1988 | Kubota et al. | 297/464 |
| 4,744,598 | 5/1988 | Ohchi | 297/183 |
| 4,761,036 | 8/1988 | Vogel | 297/452 |
| 4,779,917 | 10/1988 | Campbell et al. | 296/65.1 |
| 4,836,597 | 6/1989 | Izumida | 296/63 |

*Primary Examiner*—Robert R. Song
*Attorney, Agent, or Firm*—Price, Heneveld, Cooper DeWitt & Litton

[57] ABSTRACT

A seating system includes a load bearing shelf which is provided for carrying seats, cargo and the like. The shelf is slideably supported on opposite ends in spaced, parallel, horizontally extending tracks mounted longitudinally in the vehicle. Seats may be removably and lockably mounted to the shelf which, upon removal, allows use of the shelf for storage and other functions. The shelf is removable, and may be reversibly reinstalled in a front-to-rear reversed orientation and locked into various positions. Further, the shelf may include upper and lower convenience structural features such as pockets, sliding trays, and compartments.

54 Claims, 8 Drawing Sheets

VEHICLE SEATING SYSTEM

BACKGROUND OF THE INVENTION

The present invention relates to a vehicle interior compartment seating system, and more specifically to an adjustable shelf arrangement having seats removably mounted thereon.

Given the diverse interests and needs of today's consuming public, there continues to be a great need for devices which allow vehicles to be quickly and easily converted between people carriers (seating), campers (bedding), and cargo carriers (shelves or open space). This need is particularly prevalent today given the high costs of purchasing and maintaining more than one vehicle. Thus, devices which allow vehicles to serve dual or triple functions are in particularly great demand.

SUMMARY OF THE INVENTION

The system of the present invention provides a weight bearing horizontally adjustable shelf which may be utilized in a variety of ways. The shelf can be lockably supported within a vehicle, in at least one predetermined location. At least one seat is detachably mounted on the shelf, allowing the shelf to be easily-converted from a seat support to a storage shelf for carrying cargo and the like. In on embodiment of the present invention the seat includes a back which tilts rearwardly to form a substantially flat area for a bed. In another embodiment, the shelf integrally includes storage means for a variety of items.

These and other features, objects and advantages of the present invention will become apparent upon reading the following description thereof, together with reference to the accompanying drawings in which:

DETAILED DESCRIPTION OF THE PREFERRED EMBODIMENT

Figure 1:
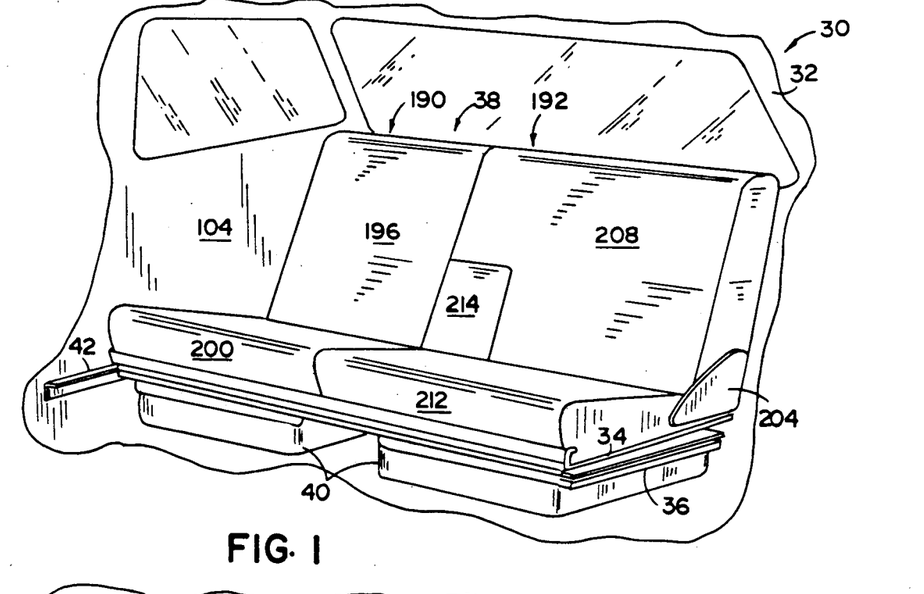
FIG. 1 is a front perspective view of one embodiment of a seating system of the present invention.
Figure 2:
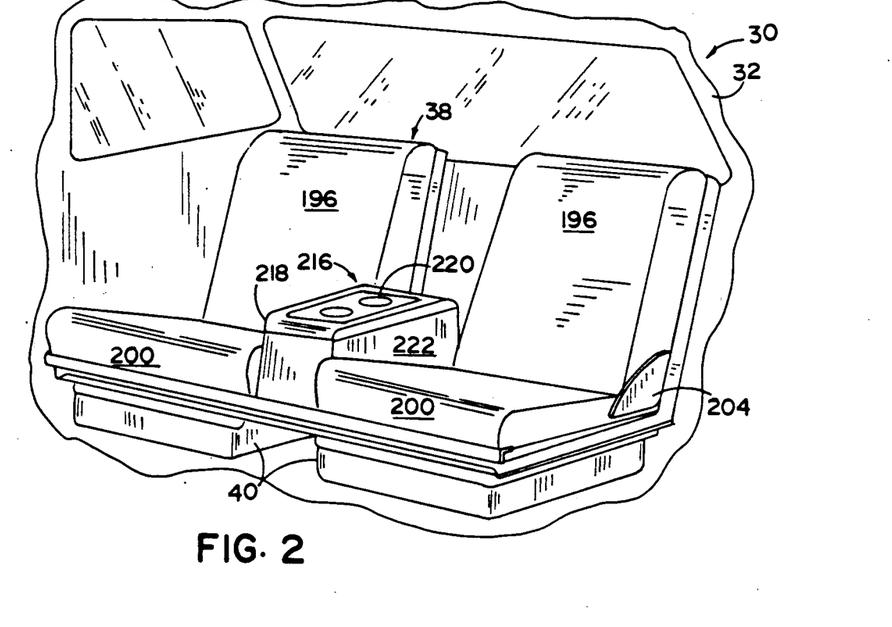
FIG. 2 is a front perspective view of another embodiment of the present invention.
Figure 10:
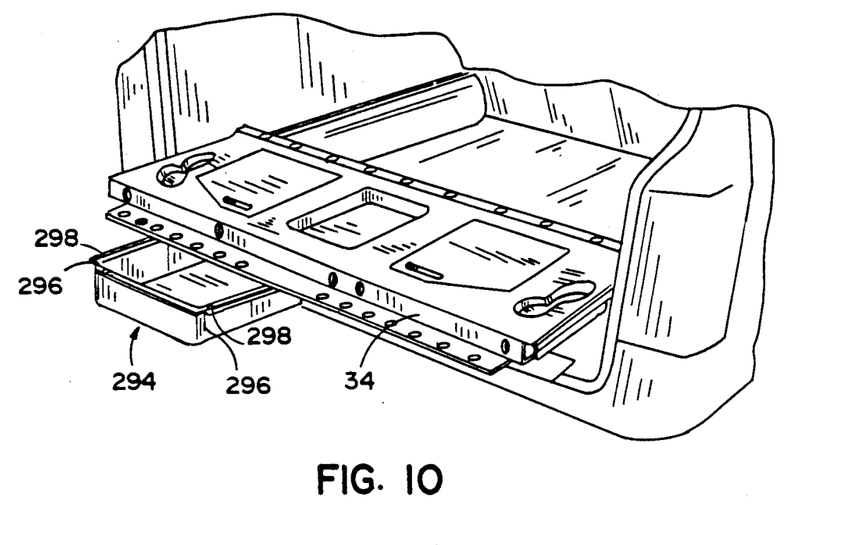
FIG. 10 is a rear perspective view of the shelf system of the present invention with the seats removed and the shelf extended rearwardly of the vehicle.
Figures 13, 16, 18, 19:
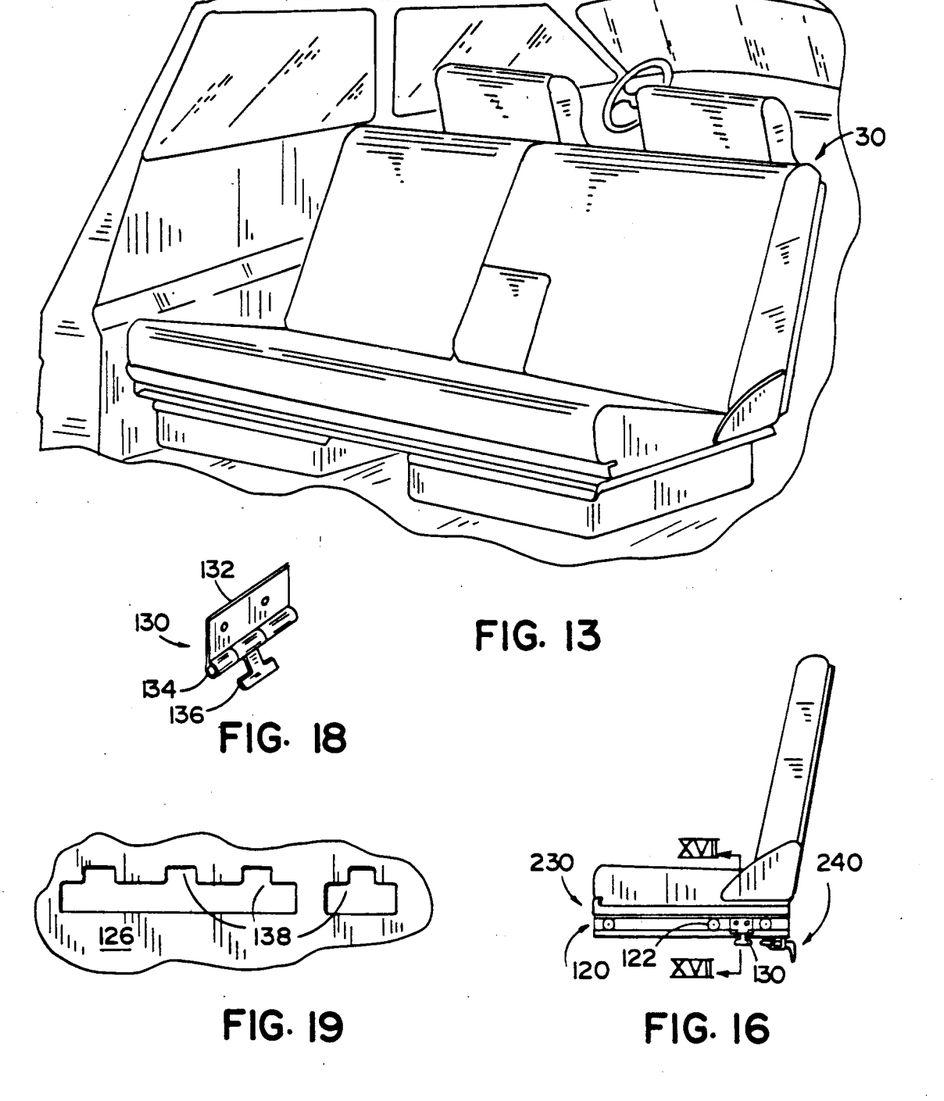
FIG. 13 is a rear perspective view of the system reversibly installed with the seats facing rearwardly.
FIG. 16 is a side elevational view of the third embodiment shown in FIG. 15.
FIG. 18 is a perspective view of a component shown in FIG. 16.
FIG. 19 is a broken-out view of a component shown in FIG. 17.

A shelf system 30 is provided for a vehicle 32 such as is shown in FIGS. 1-2. Shelf system 30 is comprised of a shelf 34, seats 38, and under-shelf trays 40. Shelf 34 is slideably supported on opposite ends by supporting structure 36 on tracks 42 mounted horizontally and longitudinally within vehicle 32. Shelf 34 is lockable into various positions, including a position in which shelf 34 extends slightly rearwardly of vehicle 32 (FIG. 10 ). Further, shelf 34 is removable and may be reversibly reinstalled in a front-to-rear reversed orientation (FIG. 13). A variety of seat combinations 38 are detachably mounted to shelf 34. Further, shelf 34 includes upper and lower storage structures such as pockets, sliding trays, and other compartments.

Figure 3:
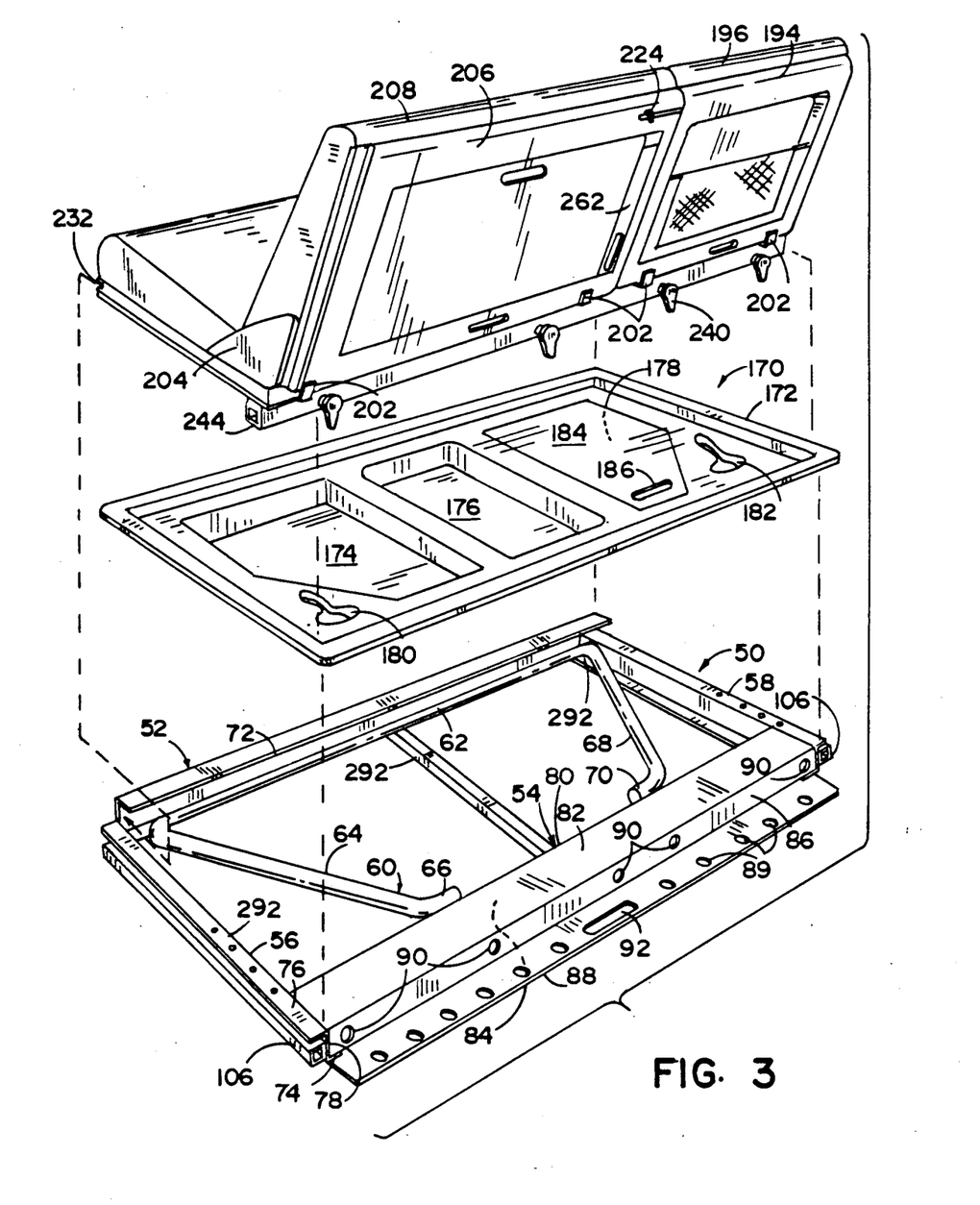
FIG. 3 is a exploded rear perspective view of the seat and shelf shown in FIG. 1.

Shelf frame 50 will now be described in detail as best shown in FIG. 3. Shelf frame 50 is a rectangularly shaped structural frame having a front member 52, rear member 54, side members 56, 58 and reinforcing tubular member 60. Front member 52 has a rearwardly facing C-shaped cross section such that a rearwardly facing upper lip 72 is formed along the front of frame 50. Side member 56 and 58 have a Z-shaped cross section with a lower lip 74, upper lip 76, and midsection 78 such that lower lip is inwardly facing and extends underneath rear member 54 and front member 52 allowing side members 56, 58 to physically structurally carry members 52, 54. Members 56 and 58 also include an upper lip 76 which becomes an integral part of the shelf supporting and locking mechanisms discussed below. Rear member 54 is a box-shaped tubular member and is the primary load bearing beam of shelf frame 50. Rear member 54 extends the width of shelf frame 50, the ends of rear member 54 resting on lower lip 74 of side members 56 and 58 and abutting midsection 78 of side members 56 and 58. Rear member 54 has a front surface 80, top surface 82, bottom surface 84, and rear surface 86, with seat attachment holes 90 located on rear surface 86. Reinforcing tubular member 60 is a continuous bent tube having front portion 62, angling side portions 64, 68, and rear portions 66, 70. The front portion 62 extends across the front portion of shelf frame 50 between the front end of side member 56 and 58 an within the channel of "C" shaped front member 52. Angling side portions 64, 68 extend from the ends of front portion 62 and angle rearwardly toward rear member 54 of frame 50. The rear portions 66, 70 of tubular frame 60 contact front surface 80 of rear frame member 54 a distance inward from the ends of 54. Members 52 through 60 are joined by methods commonly known in the art such as welding such that frame 50 forms a structurally rigid framework. Extension 88 is a flat sheet of material attached to bottom surface 84 of rear member 54 and extends a distance rearward of rear member 54. Extension 88 provides holes 89 for attachment of bungee cords and provides a resting surface for seats 38 during installation as discussed below. Lastly, extension 88 has a centrally located handle opening 92 to provide a structure for conveniently grasping frame 50 to assist in sliding shelf system 30 fore and aft or, upon removal of shelf 30, to assist in carrying the shelf.

The shelf frame cover 170 will now be described in greater detail in connection with FIG. 3. Shelf frame cover 170 consists primarily of a sheet of material which is formed to matably set upon and be affixed to frame 50. Shelf frame cover 170 may be made by a variety of means commonly known in the art such as vacuum forming of a plastic sheet, compression molding, or stamping. Cover 170 has an outer rim 172 which mates with the perimeter of frame 50 and is designed with various depressions to form compartments and holders such as depressions 174, 176, 178 and cup holders 180, 182. Depressions 174, 176, 178 can be fitted with a cover, such as cover 184 having a handle opening 186 for convenience. It should also be noted that cover 184 can be hinged to provide a permanent and secure cover for the associated compartment.

Figure 12:
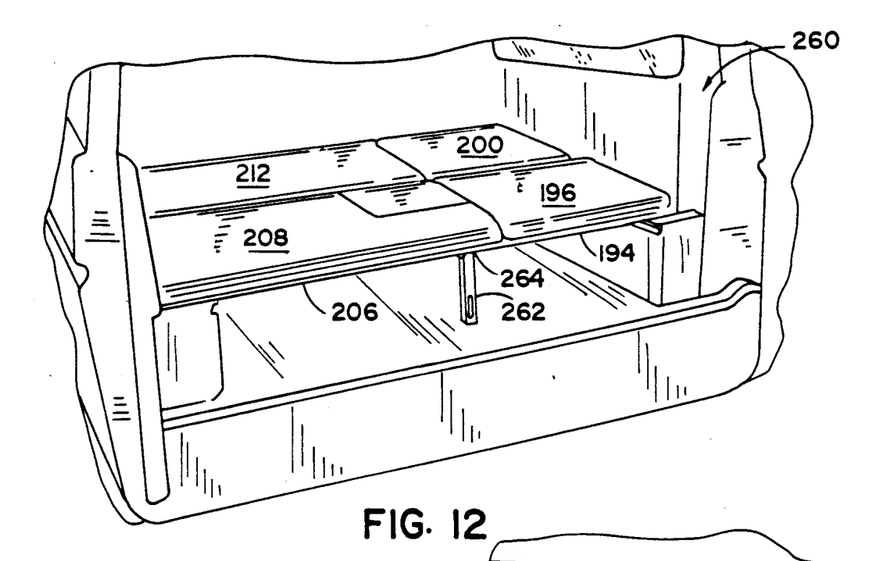
FIG. 12 is a rear perspective view of the system of the present invention shown converted into a bed.

The seats 38 are shown in FIGS. 1-3 and will now be described in detail. A variety of seat structures can be installed on top of frame 50 including structures such as a bench seat (not shown), a 60/40 seat arrangement (FIG. 1) or a 40/40 seat with console arrangement (FIG. 2). The 60/40 seat arrangement shown in FIG. 1 and 3 consists of a "40" seat generally designated as 190 which covers approximately 40% of the seating area width and a "60" seat generally designated as 192 which covers approximately 60% of the seating area width. The "40" seat 190 consists of a seat back frame 194 (FIG. 3), a seat back cushion 196, a seat in FIG. 3, back frame 194 is connected to bottom frame 198 by hinge members 202 which are commonly known in the art. Seat 190 also includes a reclining mechanism 204 which supports-seat back frame 194 in at least one upright position and also allows seat back frame 194 to recline rearwardly as seen in FIG. 12 and discussed below.

The "60" seat 192 is similar to the "40" seat 190 in that it includes a seat back frame 206, a seat back cushion 208, a seat bottom frame 210, a seat bottom cushion 212, hinge members 202 and reclining mechanism 204. The "60" seat 192, however, can also include an arm rest commonly known in the art such as tilt up arm rest 214 (FIG. 1). The 60/40 seat arrangement also includes a back frame pin 224 which slides left to right and locks seat back frame 194 to seat back frame 206.

The 40/40 seat arrangement shown in FIG. 2 includes two "40" seats 190 with a stationary console commonly known in the art located therebetween such as a stationary console 216. In the illustrated embodiment, stationary console 216 includes a console lid 218 with a cupholder 220. The console lid 218 is hinged in the rear such that it may be opened rearwardly to expose an opening within the console base 222.

Figure 4:
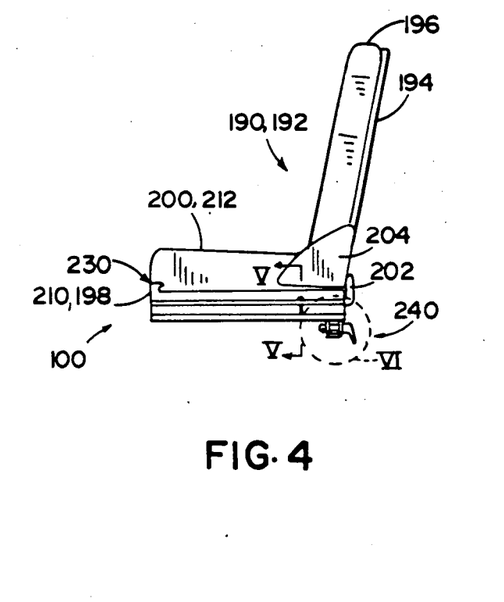
FIG. 4 is a side elevational view of the seat and shelf of FIG. 1 showing a first embodiment of the shelf control mechanism and seat locking mechanism.
Figure 5:
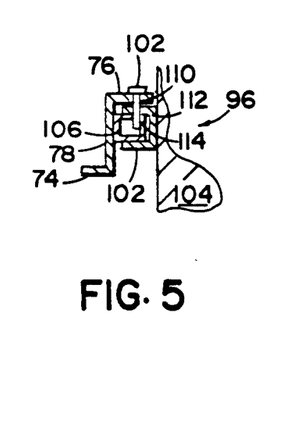
FIG. 5 is an enlarged fragmentary cross-sectional view of the shelf control mechanism taken through section lines V—V in FIG. 4.

A first embodiment of shelf control structure will now be described in detail as shown in FIGS. 4 and 5. FIG. 4 shows a side view of the shelf system 30 having a sliding surface-type design designated generally as 100. As best shown in FIG. 5, the sliding surface design 100 is comprised of a pair of slide-bearing members 106 which are slidably received within a pair of C-shaped tracks 102 mounted horizontally in parallel spaced relationship on opposite side walls 104 of vehicle 32. Each slide bearing member 106 is mounted to the midsection 78 of a respective shelf side member 56 or 58 and is constructed to carry shelf 34. Friction may be appropriately reduced by means commonly known in the art such as by application of a suitable lubricant or by the use of polymeric shims having a low coefficient of friction mounted on the bottom of slide bearing members 106 and between members 106 and associated C-shaped tracks 102. The shelf 34 can thus be positioned at a variety of locations in the vehicle to position either the seats thereon or the storage system in a desired position.

The locking of shelf 34 into a selected stationary, secure position may also be accomplished by a variety of means. In the illustrated embodiment (FIG. 5), a removable locking pin 108 is vertically placed through aligned locking holes 110 in upper lip 76 of side members 56 and 58, locking hole 112 in C-shaped track 102, and locking hole 114 in slide bearing member 106. The shelf is moved to one of a desired number of aligned locking holes in the track during use and pin 108 then inserted to hold the shelf and its contents in place along the longitudinal axis of the vehicle.

Figure 6:
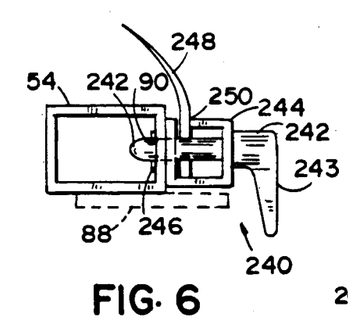
FIG. 6 is an enlarged fragmentary view of the seating mechanism taken from circle VI of FIG. 4.
Figure 7:
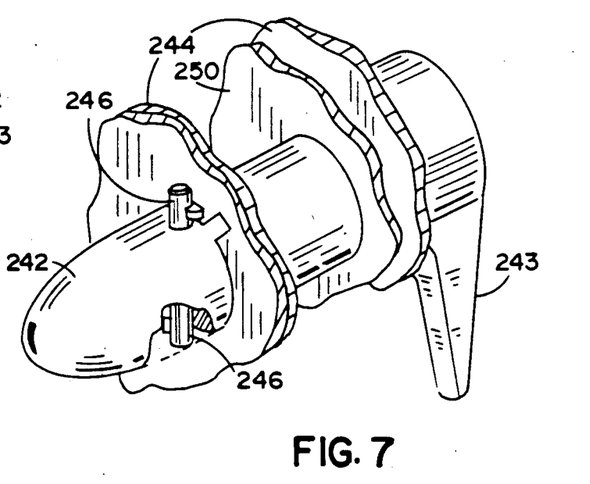
FIG. 7 is an enlarged fragmentary perspective view of the locking pin shown in FIG. 6.

The detachable seat locking mechanism will now be described as generally consisting of a front and rear attachment as best shown in FIGS. 4, 6, and 7. In the preferred embodiment, seats 190 and 192 and console 216 fit matably onto shelf 50 at a forward location generally designated as 230. As shown in FIGS. 1-4, seat bottom frames 198 and 210 include a forward mounting tongue 232. In its installed position, tongue 232 fits matably into C-shaped front member 52 of shelf frame 50 and under rearwardly facing lip 72 in a tongue and groove relationship. It should be noted that in its installed position, shelf frame cover 170 is sandwiched between seat frame 190, 192 and frame 50 The rear of the seat can be attached in a variety of ways. In the first embodiment, the rear location seat attachment 240, as shown in FIGS. 6 and 7, includes a twist pin 242 which is located within tubular box shaped member 244. Member 244 is mounted rear of seat bottom frame 198 and 212 and extends from side to side. Twist pin 242 has a handle 243 and is rotatably mounted within tubular member 244. Twist pin 242 is designed to be matably received within attachment hole 90 on rear surface 86 of shelf frame rear member 54 and includes one or more projections 246 as shown in FIG. 7 such that when seats 190, 192 are positioned in their fully installed position and twist pin 242 is fully inserted into holes 90; projection 246 is located in a seat locking position fully within tubular rear member 54. Thus when twist pins 242 are rotated, projections 246 engage the rear surface 86 of rear frame member 54 and prevent the seat frame 198, 210 from being moved or removed rearwardly. Thus seats 190, 192 are securely and detachably mounted in a front location 230 by a tongue and groove relationship, and in a rear location 240 in a pin and socket type relationship. As shown in FIG. 6, seat belts 248 may be mounted on the rear two attachment locations 240 by also placing the twist pins 242 through rear seat belt anchor 250.

Figure 8:
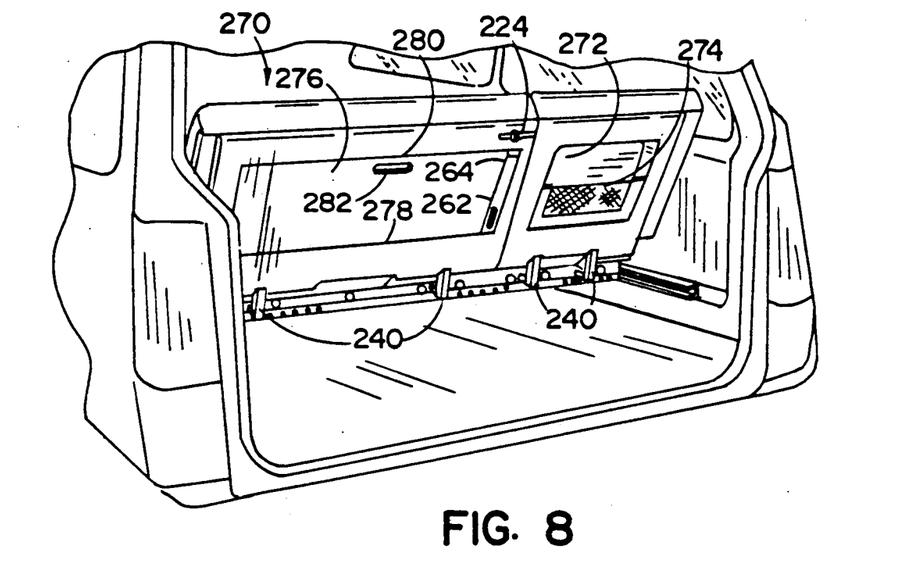
FIG. 8 is a rear perspective view of the seating system of FIG. 1 shown with the seat back trays in a closed position.
Figure 9:
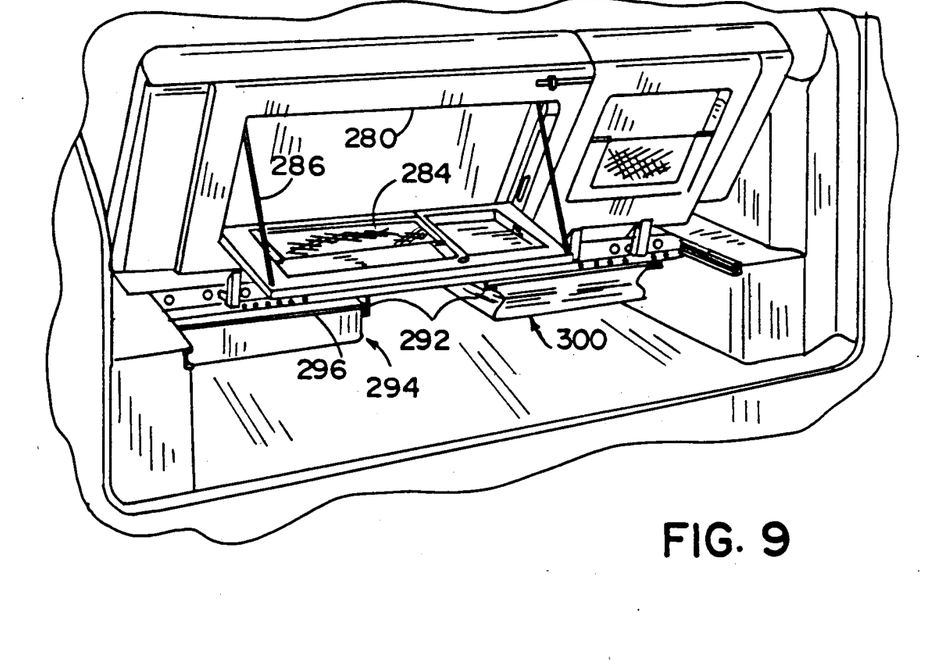
FIG. 9 is a rear perspective view of the seating system of FIG. 1 shown with the seat back trays in an open use position.

The seat back compartments generally referred to as 270 will now be described in detail as shown in FIGS. 8 and 9. A depression 272 may be formed in seat back frame 194 or 206 such that this area can be used for a compartment. The depression 272 can be made usable by installation of an elastic shaped webbing 274 or a compartment lid 276. Lid 276 can be provided with a hinge 278 at its lower edge and a catch 280 at its upper edge, catch 280 being any of a number of means as commonly known in the art. Lid 276 also includes a handle which is defined by opening 282. As shown in FIG. 9, lid 276 may be formed similar to frame cover 170 in that it may be vacuum formed or pressed and have depressions 284 in lid 276 for holding such items as tools, silverware, first aid kits, and the like. In its opened position, lid 276 is supported by cords 286 fastened to seat back frames 194, 206 and the upper edge of lid 276.

The system of this invention can also support under-seat trays generally designated as 40 and illustrated in FIGS. 9, 10, 11 and 11A, and as will now be described in detail. Under-seat trays 40 are supported on tracks 292 which are mounted on the underside of frame 50 and extend from the underside of front member 52 to rear member 54. As best shown in FIG. 10, rigid tray 294 consists of a box shaped structure having a interior compartment for carrying various articles. Tray 294 is formed with lips 296 which ride on track 292 such that tray 294 can slide forwardly or rearwardly for access. Lips 296 further have detents 298 at forward and rearward edges. These detents 298 cause resistance at selected forward and rearward locations to prevent tray 294 from accidentally sliding completely forwardly or rearwardly out of track 292. Detents 298 also cause resistance for holding tray 294 in a centrally located position.

Figure 11:
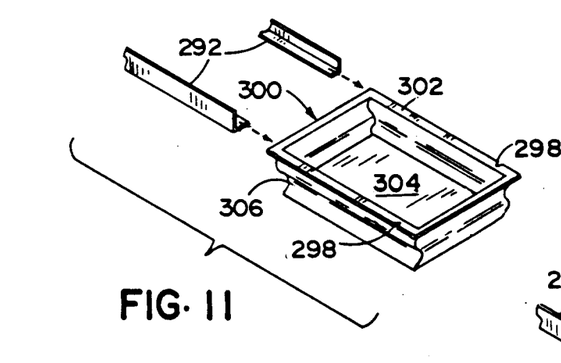
FIGS. 11 and 11A are perspective views of the collapsible tray assembly which extends under the shelf as seen in FIGS. 1 and 9.
Figure 11A:
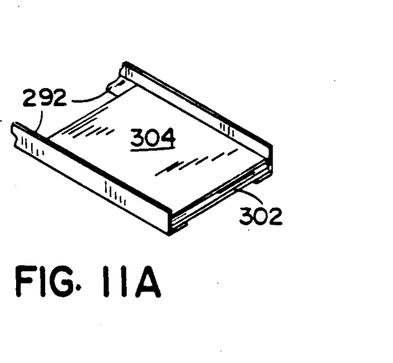

The storage system 30 also includes a collapsible tray 300 shown in FIGS. 11 and 11A. Tray 300 consists of an upper rectangular support frame 302 with sides that ride within track 292, and a container section 304 formed by a flexible bag-like structure 306. This construction allows the bag 306, when empty, to be collapsed upwardly to allow under-seat storage when not in use such as illustrated in FIG. 11A. Frame 302 also has similar detents 298 as previously discussed in rigid tray 294. Collapsible tray 300 is designed such that shelf bottom 304 may be raised against frame 302 and then slid within track 292 such that collapsible tray 300 is fully collapsed as it is held under-shelf frame 50, thus allowing for increased storage under-shelf frame 50. Alternatively, tray 300 may be inverted up-side-down and reinstalled fully collapsed on tracks 292.

The system of the present invention also permits the seats to be convertible into a bed as now be described in detail and generally referred to as 260 as shown in FIG. 12. As stated previously, reclining mechanism 204 not only holds position, but also allows frames 194 and 206 to tilt rearwardly into a substantially flat bed-like position. Thus, a substantially flat area is formed by seat sections 196, 200, 208 and 212. Support for the center of seat back frames 194 and 206 in bed arrangement 260 is provided by center support leg 262. Leg 262 is pivotally mounted at its upper end 264 to the seat back, and swings downwardly and outwardly as shown in FIG. 12. Seat back frame 194 can be tied to seat back frame 206 by frame pin 224 allowing support by 262 to support both structures securely.

In one embodiment shelf frame 50 can be slid rearwardly completely out of vehicle 32 allowing for increased storage. Frame 50 can also be reinstalled in a reversed fore-to-aft orientation such that seats 190, 192 are in a reversed orientation in the vehicle as shown in FIG. 13.

Figure 14:
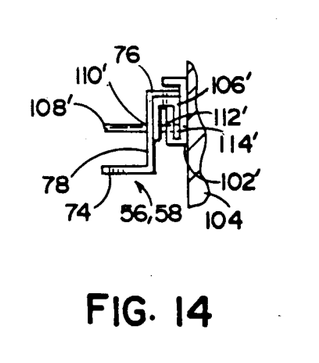
FIG. 14 is an enlarged cross-sectional view of a second embodiment of the shelf control mechanism similar to that shown in FIG. 5.
Figure 15:
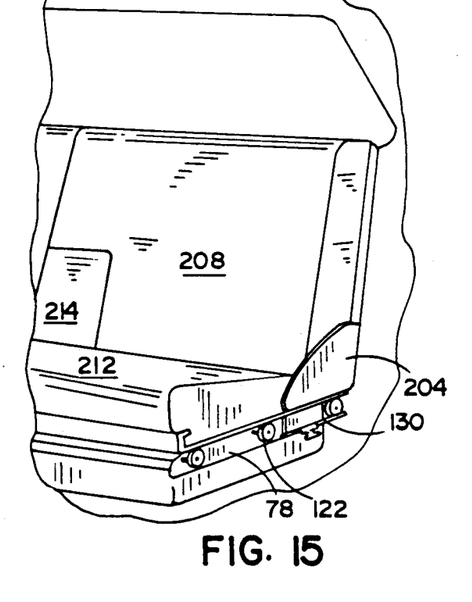
FIG. 15 is a perspective view of a third embodiment o the shelf control mechanism.

FIG. 14 shows a variation of the first embodiment of the shelf control structure wherein locking pin 108' is horizontally positioned. In this second variation, an inverted U-shaped slide bearing member 106' mounted to side members 56, 58 is slidably received within a U-shaped track 102' mounted to a sidewall 104 of vehicle 32. Thus locking pins 108' can be horizontally positioned to engage locking holes 110', 112', and 114'. This allows pins 108' to be connected by a cable (not shown) to a cable control handle centrally located on rear member 54 of frame 50. The cable control can be of conventional construction to selectively move pins between locking and unlocking positions. Thus, pins 108' can be easily and centrally retracted and, in turn, shelf 34 easily unlocked and repositioned.

Figure 17:
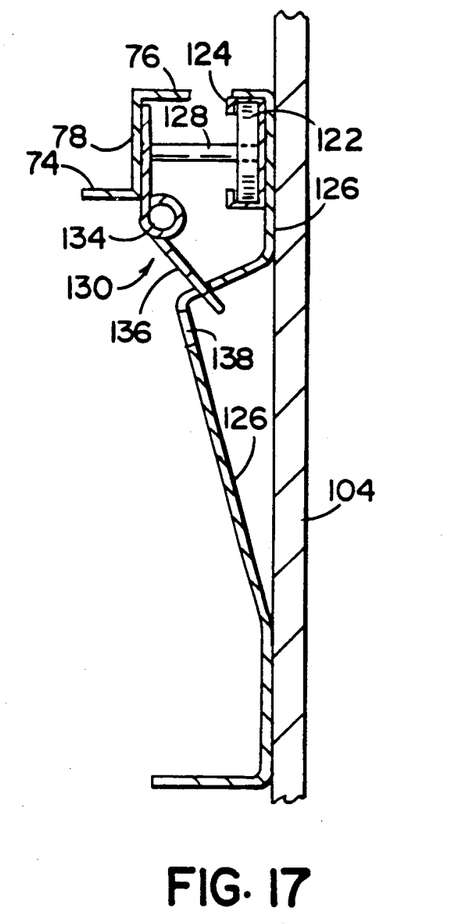
FIG. 17 is an enlarged cross-sectional view taken through lines XVII—XVII in FIG. 16.

A second shelf control structure utilizing rollers is shown in FIG. 15–19 and generally designated as 120 will now be described. As best shown in FIG. 17, shelf control design 120 consists of rollers 122 mounted at opposite sides of the seat and extending within C-shaped tracks 124. Each C-shaped track 124 is mounted to an associated track support 126 which in turn is mounted on side walls 104 of vehicle 32. Rollers 122 are mounted on axles 128 which extend into side members 56 and 58 of shelf frame 50. Also mounted to mid section 78 of side members 56, 58 is a locking hinge 130, best seen in FIG. 18, which consists of an upper hinge bracket 132, a hinge pin and spring 134, and a T-engagement tongue 136. Hinge pin and spring 134 urge T-engagement tongue 136 outwardly and into T-notches 138 which are positioned along the longitudinal length of the track support 126 such that shelf 34 can be locked into a multitude of positions, T-notches 138 being a variety of shapes as shown in FIG. 19.

Each of the shelf control structure designs described (100 and 120), allow the shelf to be slid forwardly, rearwardly, and be removed from vehicle 32. Each can also be constructed to allow shelf 34 to be reversibly installed fore to aft. Also, each allow shelf 34 to be positioned rearwardly sufficiently to extend slightly rearwardly beyond the rear of vehicle 32 as shown in FIG. 10.

Figure 20:
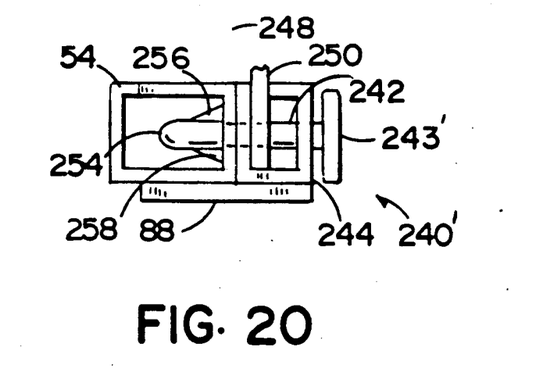
FIG. 20 is an enlarged fragmentary view of a second embodiment of the seat attachment mechanism similar to that shown in FIG. 6.

In a second embodiment for the seat locking mechanism (shown in FIG. 20), rear location seat attachment 240' is designed with a snap locking pin 254 having moveable engagement members 256 which snap outwardly into position as pin 254 is slipped forward into the installed position in rear member 54. Engagement members 256 are released by methods commonly known in the art such as an internal mechanism 258 which releases the outward pressure on 256 when handle 243' is pulled, thus allowing engagement members 256 to retract into pin 254.

The seat shelf system 30 of this invention is best utilized in a vehicle such as a van, although other vehicles such as station wagons and passenger cars can also benefit from this system. Briefly, seats such as seats 190, 192 are installed on shelf 34 and placed within a vehicle 32. The shelf is then slid fore or aft to the desired position on tracks such as tracks 102, 124, or 136 and locked into position such as through the use of locking pins 108, 108' or T-engagement tongues 136. Various seating styles and types may be chosen with or without centrally located structures such as armrest 214, stationary console 216 or foldable console 265 Additional storage compartments and depressions may be provided on the seat backs 194,206, shelf frame cover 170, or by under-shelf trays 40 such as illustrated in FIG. 3 and 9. The preferred embodiment illustrates two under-shelf trays 40, those being rigid tray 294 and collapsible tray 300 which slide forwardly or rearwardly under the shelf 34.

In addition to providing a highly functional seating arrangement, seats 38 may be detachably mounted to shelf 34 such that the shelf becomes a highly useful slidable weight bearing storage and carrying shelf. Seats 38 may be made detachable through the use of structures illustrated in the preferred embodiment such as front seat attachment 230 which is substantially a tongue and groove relationship, and rear attachment 240 which provides a pin and socket arrangement. To remove seats 38, a user merely needs to release the retaining pin at the rear location 240 and slide the seat rearwardly until front location 230 is disengaged. The user may then physically lift up and remove seats 38 from vehicle 32 leaving the shelf structure in place. The seats 38 are reattached to the vehicle by merely reversing this procedure by placing a seat 38 on the shelf 34, sliding the seat 38 forward into the locking position, and causing the locking pins 242 or 254 to securely attach.

With the seats 38 removed, the shelf 34 offers a substantially flat upper surface on which various packages and boxes may be set. The shelf is designed such that it may extend slightly rearwardly of the vehicle to facilitate loading, thus enhancing the use of shelf 34 as a weight bearing shelf system 30. Once loaded, the shelf can easily be move forwardly as desired to a position for transportation.

One seat arrangement offers rearwardly tilting back frames 194, 206 such that the seat backs may be laid flat to a form a bed. In this configuration a center support leg 262 is folded outwardly such that seat backs in their rearward most position are supported by leg 262. Also, a sliding locking pin 224 can be used to lock side-by-side seats together thus increasing rigidity.

Shelf 34 may also be easily removed from the vehicle offering an open rear vehicle compartment for cargo and the like.

Finally, shelf 34 may be reversibly installed. Thus, not only can seats 38 be positioned to face rearward, but shelf 34 can be slid to the rear of the vehicle offering substantially a bleacher-like arrangement with seats 38 facing rearwardly out of the vehicle.

It should be evident from the above description that this invention provides a sliding shelf system for vehicles having a weight bearing slidable shelf which may be slideably positioned and locked into a variety of useful positions. Further, seats may be removably mounted thereto to provide a highly useful and convertible seating, bedding, or cargo carrying structure.

Having described the invention, it should be understood that although a preferred embodiment has been disclosed herein, other modifications and embodiments can be utilized without departing from the spirit or scope of this invention as defined by the appended claims.

The embodiments of the invention in which an exclusive property or privilege is claimed are defined as follows:

1. A weight bearing slideable shelf system for a vehicle comprising:
   a generally rectangular weight bearing shelf and track means for slidably supporting said shelf in for movement in the fore/aft direction in spaced relationship above the floor of a vehicle; said shelf further including means for removably mounting at least one seat thereto;
   a seat including fastening means cooperating with said shelf for removably mounting said seat to said shelf; and
   said track means for slidably supporting said shelf permitting said shelf to extend outwardly of a vehicle when the vehicle access door is opened.

2. A weight bearing slideable shelf system for a vehicle comprising:
   a generally rectangular weight bearing shelf and means for lockable supporting said shelf in at least one predetermined fore/aft position in spaced relationship above the floor of a vehicle; said shelf further including means for removably mounting at least one seat thereto;
   a seat including fastening means cooperating with said shelf for removably fastening said seat to said shelf; and
   said fastening means includes a quick disconnect fitting.

3. A weight bearing slideable shelf system for a vehicle comprising:
   a generally rectangular weight bearing shelf and means for lockably supporting said shelf in at least one predetermined fore/aft position in spaced relationship above the floor of a vehicle; said shelf further including means for removably mounting at least one seat thereto;
   a seat including fastening means cooperating with said shelf for removably fastening said seat to said shelf; and
   said fastening means includes a quick disconnect fitting and further includes a lip spaced from said quick disconnect fitting and wherein said shelf includes a groove for receiving said lip.

4. The system as defined in claim 2 wherein said means for lockably supporting said shelf includes at least one track for mounting to a vehicle and wherein said shelf includes shelf supporting means adapted to slideably engage said track.

5. The system as defined in claim 4 and further including locking means extending between said track and said shelf supporting means to lock said shelf in at least one predetermined fore/aft position.

6. The system as defined in claim 4 wherein said means for lockably supporting said shelf can be unlocked allowing said shelf to be removed from said track.

7. The system as defined in claim 6 wherein said shelf can be reversibly reinstalled on said track.

8. A weight bearing slideable shelf system for a vehicle comprising:
   a generally rectangular weight bearing shelf and means for lockable supporting said shelf in at least one predetermined fore/aft position in spaced relationship above the floor of a vehicle; said shelf further including means for removable mounting at least one seat thereto;
   a seat including fastening means cooperating with said shelf for removable mounting said seat to said shelf;
   said means for lockably supporting said shelf includes at least one track for mounting to a vehicle and wherein said shelf includes shelf supporting means adapted to slideably engage said track; and said track and shelf supporting means permit said shelf to extend outwardly of a vehicle when the vehicle access door is opened.

9. A weight bearing slideable shelf system for a vehicle comprising:
- a generally rectangular weight bearing shelf and means for lockably supporting said shelf in at least one predetermined fore/aft position in spaced relationship above the floor of a vehicle; said shelf further including means for removably mounting at least one seat thereto;
- a seat including fastening means cooperating with said shelf for removably fastening said seat to said shelf; and
- said seat includes a seat back and a seat bottom and a hinge operably connecting said seat back to said seat bottom wherein said hinge supports said seat back in at least one upright position and allows said seat back to tilt rearwardly to a substantially flat position;
- said seat back including support means for supporting said seat back in said flat position.

10. The system as defined in claim 9 wherein said seat back support means comprises a center support leg which is pivotally mounted to said seat back and which swings outwardly and
- extends downwardly to engage the vehicle floor to support said seat back in said flat position.

11. A weight bearing slideable shelf system for a vehicle comprising:
- a generally rectangular weight bearing shelf and means for lockably supporting said shelf in at least one predetermined fore/aft position in spaced relationship above the floor of a vehicle; said shelf further including means for removably mounting at least one seat thereto;
- a seat including fastening means cooperating with said shelf for removably fastening said seat to said shelf; and
- said seat includes a pair of seat sections each with a seat back and a seat bottom.

12. The system as defined in claim 11 and further including a console mounted between said seats.

13. A weight bearing slideable shelf system for a vehicle comprising:
- a generally rectangular weight bearing shelf and means for lockably supporting said shelf in at least one predetermined fore/aft position in spaced relationship above the floor of a vehicle; said shelf further including means for removably mounting at least one seat thereto;
- a seat including fastening means cooperating with said shelf for removably fastening said seat to said shelf; and
- said seat includes a seat back including a compartment mounted on said seat back by a hinge mounted to the bottom of said compartment such that said compartment folds rearwardly open to form a generally horizontal surface, wherein said compartment is supported by a cord attached to said back and compartment to hold said compartment in its open position; and a latch on said seat back to hold said compartment in its closed position.

14. A weight bearing slideable shelf system for a vehicle comprising:
- a generally rectangular weight bearing shelf and means for lockably supporting said shelf in at least one predetermined fore/aft position in spaced relationship above the floor of a vehicle; said shelf further including means for removably mounting at least one seat thereto;
- a seat including fastening means cooperating with said shelf for removably fastening said seat to said shelf; and
- said shelf has a tubular frame and a top surface; and
- said top surface includes depressions for holding articles therein.

15. A weight bearing slideable shelf system for a vehicle comprising:
- a generally rectangular weight bearing shelf and means for lockably supporting said shelf in at least one predetermined fore/aft position in spaced relationship above the floor of a vehicle; said shelf further including means for removably mounting at least one seat thereto;
- a seat including fastening means cooperating with said shelf for removably fastening said seat to said shelf; and
- said shelf includes underside tray support means; and
- at least one tray removably mounted on said underside tray support means.

16. The system as defined in claim 15 wherein said tray has collapsible sidewalls.

17. The system as defined in claim 16 wherein said tray can be inserted into said underside support means in a collapsed, storage position, thus allowing for increased storage under said shelf.

18. A seating and storage system for the interior of a vehicle having opposing tracks mounted horizontally and longitudinally along the interior sidewalls of the vehicle and locking receiving means associated with at least one of said tracks comprising:
- a generally rectangular shelf including a support means, a locking means, and a seat attachment receiving means wherein said support means slideably engages the opposing tracks and wherein said locking means operably and adjustably engage the locking receiving means to hold said shelf securely in at least one fore/aft position; and
- at least one seat detachably mounted to said seat attachment receiving means.

19. An improvement in a vehicle having a longitudinally extending interior tunnel area, the improvement comprising:
- support tracks for mounting horizontally and longitudinally along the interior sidewalls of the vehicle;
- a weight bearing shelf including a support means which slideably engages said tracks; said shelf further including locking means for adjustably engaging said tracks to hold said weight bearing shelf securely in place; and
- at least one seat detachably mounted to said shelf.

20. A slideable shelf system for a vehicle comprising:
- a shelf of generally rectangular shape including slideable support receiving means and further including locking receiving means;
- means for slidably supporting said shelf cooperating with said slideable support receiving means to allow said shelf to slidingly move within a vehicle;
- means for locking said shelf cooperating with said locking receiving means to secure said shelf in at least one position;
- said shelf further including a means for attaching at least one seat thereto; and at least one seat including attaching receiving means cooperating with said attaching means on said shelf for mounting said seat to said shelf.

21. The apparatus as defined in claim 20 wherein said seat is detachably mounted by said attaching receiving means to said attaching means on said shelf.

22. The apparatus as defined in claim 21 wherein said attaching means on said shelf and said attaching receiving means includes a tongue and groove coupling.

23. The apparatus as defined in claim 21 wherein said attaching means on said shelf and said attaching receiving means on said seat includes a pin and socket coupling.

24. The apparatus as defined in claim 21 wherein said attaching means on said shelf and said attaching receiving means on said seat includes a tongue and groove coupling and further includes a pin and socket coupling remote from said tongue and groove coupling.

25. The apparatus as defined in claim 20 wherein said means for slidably supporting said shelf includes at least one supporting structure positioned horizontally and longitudinally within the vehicle.

26. The apparatus as defined in claim 25 wherein said supporting structure includes said locking means.

27. The apparatus as defined in claim 20 wherein said shelf is removable from said supporting structure of the vehicle for storage remote from the vehicle.

28. The apparatus as defined in claim 27 wherein said shelf can be reinstalled on said supporting structure of the vehicle in a reversed position.

29. The apparatus as defined in claim 28 wherein said shelf includes a handle for carrying said shelf when said shelf is removed.

30. The apparatus as defined in claim 20 wherein said means for slidably supporting said shelf allows said shelf to slidably extend a distance rearwardly of said vehicle; said means for slidably supporting said shelf supporting said shelf as extended.

31. The apparatus as defined in claim 20 wherein said seat includes a seat back and a seat bottom;
a hinge coupled between said seat back and bottom for supporting said seat back in at least one upright position on said seat bottom and allowing said seat back to tilt rearwardly to a substantially flat bed-like position.

32. The apparatus as defined in claim 31 wherein a center-leg support is pivotally mounted to said seat back and pivots outwardly and downwardly to support said seat back when in the flat bed-like position.

33. The apparatus as defined in claim 20 wherein said seat includes a first seat section which extends about 60% of the distance across said vehicle, and
said seat includes a second seat section which extends about 40% of the distance across said vehicle.

34. The apparatus as defined in claim 20 wherein said seat includes a first and a second seat section both of which extend separately about 40% or the distance across said vehicle; and
a console mounted to said shelf and positioned between said first and second seat sections.

35. The apparatus as defined in claim 20 wherein said seat includes a seat back and a seat bottom, and said seat back includes a depression on a rearward side thereof for use as a compartment.

36. The apparatus as defined in claim 20 wherein said shelf includes an upper surface with at least one depression for use as a compartment.

37. The apparatus as defined in claim 20 wherein tray support means are mounted to the underside of said shelf to and include detents; and
at least one drawer is removably mounted on said tray support means under said shelf such that said drawer is retained in at least one position by said detents.

38. The apparatus as defined in claim 37 wherein at least one of said drawers is collapsible.

39. The apparatus as defined in claim 38 wherein said tray can be inserted into said underside support means in a collapsed, storage position, thus allowing for increased storage under said shelf.

40. A shelf system for a vehicle comprising:
a shelf of generally rectangular shape including support receiving means and further including locking receiving means;
track means positioned in the vehicle and cooperating with said support receiving means for supporting said shelf within a vehicle;
locking means on said track means and cooperating with said locking receiving means on said shelf to secure said shelf in at least one position;
at least one seat; and
attaching means and attaching receiving means extending between said seat and said shelf for detachably mounting said seat to said shelf.

41. The apparatus as defined in claim 40 wherein said attaching means on said shelf and said attaching receiving means includes a tongue and groove coupling.

42. The apparatus as defined in claim 40 wherein said attaching means on said shelf and said attaching receiving means includes a pin and socket coupling.

43. The apparatus as defined in claim 40 wherein said attaching means on said shelf and said attaching receiving means includes a tongue and groove coupling and further includes a pin and socket coupling remote from said tongue and groove coupling.

44. The apparatus as defined in claim 40 wherein said shelf is removable from said supporting structure of the vehicle for storage remote from the vehicle.

45. The apparatus as defined in claim 40 wherein said shelf can be reinstalled on said supporting structure of the vehicle in a reversed position.

46. The apparatus as defined in claim 40 wherein said means for supporting said shelf allows said shelf to be extended a distance rearward of said vehicle;
said means for supporting said shelf supporting said shelf as extended.

47. The apparatus as defined in claim 40 wherein said seat includes a seat back and a seat bottom;
a hinge coupled between said seat back and bottom for supporting said seat back in at least one upright position on said seat bottom and allowing said seat back to tilt rearwardly to a substantially flat bed-like position.

48. The apparatus as defined in claim 47 wherein a center leg support is pivotally mounted to said seat back and pivots outwardly and downwardly to support said seat back when in the flat bed-like position.

49. The apparatus as defined in claim 40 wherein said seat includes a first seat section which extends about 60% of the distance across said vehicle; and
said seat includes a second seat section which extends about 40% of the distance across said vehicle.

50. The apparatus as defined in claim 40 wherein said seat includes a first and a second seat section both of which extend separately about 40% of the distance across said vehicle; and     a console mounted to said shelf and positioned between said first and second seat sections.

51. The apparatus as defined in claim 40 wherein undershelf tray support means are mounted to the underneath side of said shelf and include detents; and     at least one drawer is removably mounted on said support means under said shelf such that said drawer slides forwardly and rearwardly, and further said drawer is retained in at least one position by said detents.

52. The apparatus as defined in claim 51 wherein at least one of said drawers is collapsible.

53. The system as defined in claim 52 wherein said tray can be inserted into said underside support means in a collapsed, storage position, thus allowing for increased storage under said shelf.

54. A method of supporting a seat in a vehicle comprising the steps of:

positioning a track means in a vehicle for spacially supporting a shelf a distance above the floor or a vehicle;

slideably and lockably mounting a weight bearing shelf in said track means; and     detachably positioning at least one seat on said shelf by use of at least one quick disconnect fitting.

* * * * *

UNITED STATES PATENT AND TRADEMARK OFFICE
CERTIFICATE OF CORRECTION

PATENT NO. : 5,039,155  Page 1 of 2

DATED : August 13, 1991

INVENTOR(S) : Michael J. Suman et al.

It is certified that error appears in the above-identified patent and that said Letters Patent is hereby corrected as shown below:

```
Column 1, line 28:
   "on" should be --one--;

Column 1, line 43:
   "a" should be --an--;

Column 2, line 7:
   "o" should be --of--;

Column 2, line 63:
   "an" should be --and--;

Column 3, line 41:
   After "seat" insert --bottom frame 198, and a seat bottom
   cushion 200. As shown--;

Column 4, line 40:
   After "50" insert --.--;

Column 5, line 51:
   "now" should be --will--;

Column 6, line 25:
   "on" should be --to--;

Column 6, line 67:
   After "265" insert --.--;

Column 7, line 30:
   "move" should be --moved--;
```

UNITED STATES PATENT AND TRADEMARK OFFICE
CERTIFICATE OF CORRECTION

PATENT NO.   : 5,039,155
DATED        : August 13, 1991
INVENTOR(S)  : Michael J. Suman et al.

It is certified that error appears in the above-identified patent and that said Letters Patent is hereby corrected as shown below:

```
Column 7, claim 1, line 66:
   After "shelf" delete "in";

Column 8, claim 2, line 12:
   "lockable" should be --lockably--;

Column 8, claim 8, line 57:
   "lockable" should be --lockably--;

Column 8, claim 8, line 60:
   "removable" should be --removably--;

Column 8, claim 8, line 63:
   "removable" should be --removably--;

Column 10, claim 18, line 41:
   "engage" should be --engages--.
```

Signed and Sealed this

Twenty-fifth Day of May, 1993

Attest:

MICHAEL K. KIRK

*Attesting Officer*     *Acting Commissioner of Patents and Trademarks*